(12) United States Patent
Suciu et al.

(10) Patent No.: US 7,883,314 B2
(45) Date of Patent: Feb. 8, 2011

(54) SEAL ASSEMBLY FOR A FAN-TURBINE ROTOR OF A TIP TURBINE ENGINE

(75) Inventors: Gabriel L. Suciu, Glastonbury, CT (US); James W. Norris, Lebanon, CT (US); Craig A. Nordeen, Manchester, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 938 days.

(21) Appl. No.: 11/719,296

(22) PCT Filed: Dec. 1, 2004

(86) PCT No.: PCT/US2004/040106

§ 371 (c)(1),
(2), (4) Date: May 15, 2007

(87) PCT Pub. No.: WO2006/059994

PCT Pub. Date: Jun. 8, 2006

(65) Prior Publication Data

US 2009/0142188 A1 Jun. 4, 2009

(51) Int. Cl.
*F01D 11/08* (2006.01)
(52) U.S. Cl. .................. 415/173.5; 415/174.5
(58) Field of Classification Search ............ 415/143, 415/173.1, 173.5, 174.5
See application file for complete search history.

(56) References Cited

U.S. PATENT DOCUMENTS

| | | | |
|---|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |
| 3,204,401 A | 9/1965 | Serriades |
| 3,216,455 A | 11/1965 | Cornell et al. |

(Continued)

FOREIGN PATENT DOCUMENTS

DE 1173292 7/1964

(Continued)

*Primary Examiner*—Ninh H Nguyen
*Assistant Examiner*—Dwayne J White
(74) *Attorney, Agent, or Firm*—Carlson Gaskey & Olds P.C.

(57) ABSTRACT

A seal assembly (116) mounted within a rotationally fixed static outer support structure (14) for engagement with an annular seal face surface (172) located upon a fan-turbine rotor assembly. The seal assembly provides minimal leakage of core airflow when the airflow is turned and diffused by the diffuser section (74) to increase the engine operating efficiency.

5 Claims, 4 Drawing Sheets

U.S. PATENT DOCUMENTS

| | | | |
|---|---|---|---|
| 3,267,667 A | 8/1966 | Erwin | |
| 3,269,120 A | * 8/1966 | Sabatiuk | 60/39.43 |
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flatt | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,130,379 A | 12/1978 | Partington | |
| 4,147,035 A | 4/1979 | Moore et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,443,590 A | 8/1995 | Ciokajlo et al. | |
| 5,466,198 A | 11/1995 | McKibbin et al. | |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,223,616 B1 | 5/2001 | Sheridan | |
| 6,244,539 B1 | 6/2001 | Lifson et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,851,264 B2 | 2/2005 | Kirtley et al. | |
| 6,883,303 B1 | 4/2005 | Seda | |
| 6,910,854 B2 | 6/2005 | Joslin | |
| 7,021,042 B2 | 4/2006 | Law | |
| 7,214,157 B2 | 5/2007 | Flamang et al. | |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1 | 10/2003 | Paul | |
| 2004/0025490 A1 | 2/2004 | Paul | |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |

FOREIGN PATENT DOCUMENTS

| | | |
|---|---|---|
| DE | 19519322 | 11/1996 |
| FR | 1367893 | 7/1964 |
| GB | 905136 | 9/1962 |
| GB | 1026102 | 4/1966 |
| GB | 1287223 | 8/1972 |
| GB | 1338499 | 11/1973 |
| GB | 2026102 | 1/1980 |
| JP | 10184305 | 7/1998 |
| WO | 9902864 | 1/1999 |
| WO | 02081883 | 10/2002 |
| WO | 2004022948 | 3/2004 |
| WO | 2004092567 | 10/2004 |
| WO | 2006059973 | 6/2006 |
| WO | 2006059974 | 6/2006 |
| WO | 2006059981 | 6/2006 |
| WO | 2006059994 | 6/2006 |
| WO | 2006059995 | 6/2006 |
| WO | 2006060011 | 6/2006 |
| WO | 2006060013 | 6/2006 |
| WO | 2006060014 | 6/2006 |

* cited by examiner

SEAL ASSEMBLY FOR A FAN-TURBINE ROTOR OF A TIP TURBINE ENGINE

This invention was made with government support under Contract No.: F33657-03-C-2044. The government therefore has certain rights in this invention.

BACKGROUND OF THE INVENTION

The present invention relates to a tip turbine engine, and more particularly to a fan-turbine rotor assembly which provides mechanical retention between a multiple of intricate rotational components.

An aircraft gas turbine engine of the conventional turbofan type generally includes a forward bypass fan, a compressor, a combustor, and an aft turbine all located along a common longitudinal axis. A compressor and a turbine of the engine are interconnected by a shaft. The compressor is rotatably driven to compress air entering the combustor to a relatively high pressure. This pressurized air is then mixed with fuel in a combustor and ignited to form a high energy gas stream. The gas stream flows axially aft to rotatably drive the turbine which rotatably drives the compressor through the shaft. The gas stream is also responsible for rotating the bypass fan. In some instances, there are multiple shafts or spools. In such instances, there is a separate turbine connected to a separate corresponding compressor through each shaft. In most instances, the lowest pressure turbine will drive the bypass fan.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor and ignited to form a high energy gas stream which drives the turbine integrated onto the tips of the hollow bypass fan blades for rotation therewith as generally disclosed in U.S. Patent Application Publication Nos.: 20030192303; 20030192304; and 20040025490.

The tip turbine engine provides a thrust to weight ratio equivalent to conventional turbofan engines of the same class within a package of significantly shorter longitudinal length.

One significant rotational component of a TTE is the fan-turbine rotor assembly. The fan-turbine rotor assembly includes intricate components, which rotate at relatively high speeds to generate bypass airflow while communicating a core airflow through each of the multiple of hollow fan blades. Sealing of the communication path between the ambient pressure fan airflow inlet and the high-pressure combustor intake provides design challenges due in part to the relatively large fan-turbine rotor assembly diameter and the large pressure delta.

Accordingly, it is desirable to provide a seal assembly which provides effective sealing between the rotating fan-turbine rotor assembly and the rotationally fixed annular combustor.

SUMMARY OF THE INVENTION

A fan-turbine rotor assembly for a tip turbine engine according to the present invention includes a diffuser section on the rotating fan blades. The diffuser section includes an annular diffuser face surface. The annular diffuser face surface is located below and directly adjacent a diffuser discharge that communicates with a rotationally fixed annular combustor.

A seal assembly is mounted within the rotationally fixed static outer support structure for engagement with the annular seal face surface. The seal assembly provides minimal leakage of core airflow when the airflow is turned and diffused by the diffuser section to increase the engine operating efficiency.

The present invention therefore provides a seal assembly which provides effective sealing between the rotating fan-turbine rotor assembly and the rotationally fixed annular combustor.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
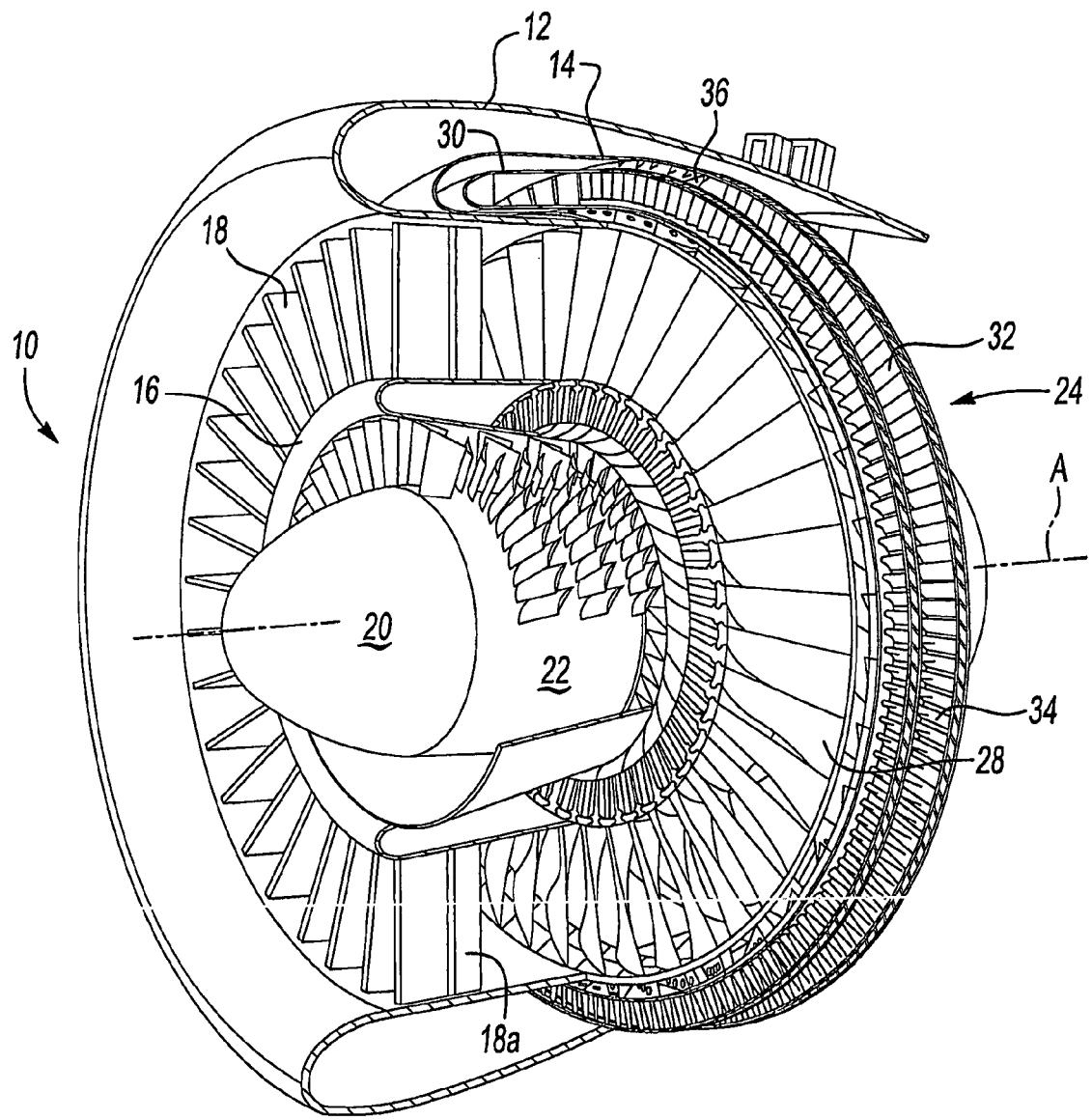
FIG. 1 is a partial sectional perspective view of a tip turbine engine.

FIG. 1 illustrates a general perspective partial sectional view of a tip turbine engine type gas turbine engine 10. The engine 10 includes an outer nacelle 12, a rotationally fixed static outer support structure 14 and a rotationally fixed static inner support structure 16. A multiple of fan inlet guide vanes 18 are mounted between the static outer support structure 14 and the static inner support structure 16. Each inlet guide vane preferably includes a variable trailing edge 18A.

A nose cone 20 is preferably located along the engine centerline A to smoothly direct airflow into an axial compressor 22 adjacent thereto. The axial compressor 22 is mounted about the engine centerline A behind the nose cone 20.

A fan-turbine rotor assembly 24 is mounted for rotation about the engine centerline A aft of the axial compressor 22. The fan-turbine rotor assembly 24 includes a multiple of hollow fan blades 28 to provide internal, centrifugal compression of the compressed airflow from the axial compressor 22 for distribution to an annular combustor 30 located within the rotationally fixed static outer support structure 14.

A turbine 32 includes a multiple of tip turbine blades 34 (two stages shown) which rotatably drive the hollow fan blades 28 relative a multiple of tip turbine stators 36 which extend radially inwardly from the static outer support structure 14. The annular combustor 30 is axially forward of the turbine 32 and communicates with the turbine 32.

Figure 2:
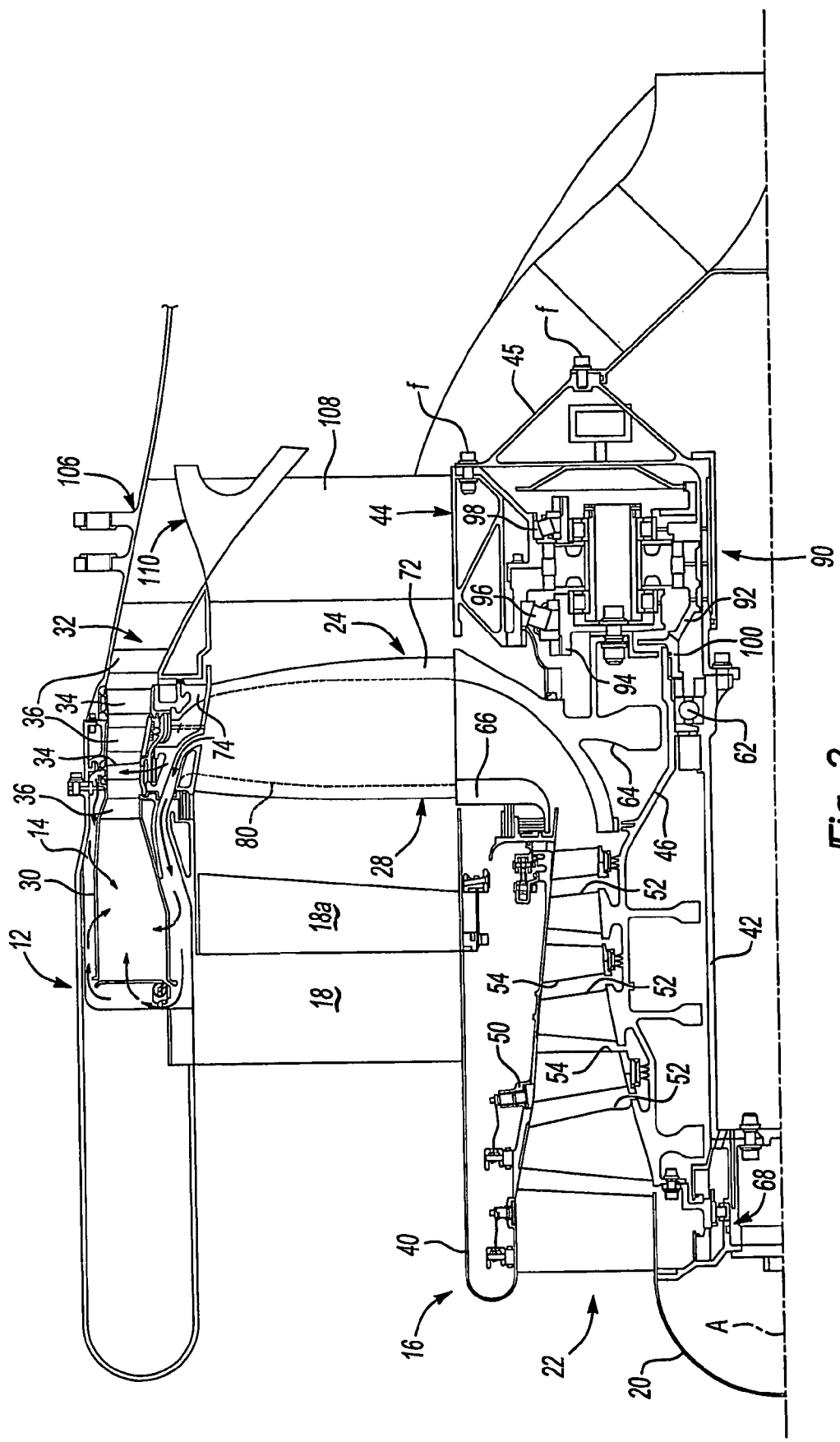
FIG. 2 is a longitudinal sectional view of a tip turbine engine along an engine centerline.

Referring to FIG. 2, the rotationally fixed static inner support structure 16 includes a splitter 40, a static inner support housing 42 and a static outer support housing 44 located coaxial to said engine centerline A.

The axial compressor 22 includes the axial compressor rotor 46 from which a plurality of compressor blades 52 extend radially outwardly and a compressor case 50 fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a multiple of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is turned and diffused toward an axial airflow direction toward the annular combustor 30. Preferably the airflow is diffused axially forward in the engine 10, however, the airflow may alternatively be communicated in another direction.

A gearbox assembly 90 aft of the fan-turbine rotor assembly 24 provides a speed increase between the fan-turbine rotor assembly 24 and the axial compressor 22. Alternatively, the gearbox assembly 90 could provide a speed decrease between the fan-turbine rotor assembly 24 and the axial compressor rotor 46. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 46. The gearbox assembly 90 is mounted for rotation between the sun gear shaft 92 and the static outer support housing 44 through a forward bearing 96 and a rear bearing 98. The forward bearing 96 and the rear bearing 98 are both tapered roller bearings and both handle radial loads. The forward bearing 96 handles the aft axial loads while the rear bearing 98 handles the forward axial loads. The sun gear shaft 92 is rotationally engaged with the axial compressor rotor 46 at a splined interconnection 100 or the like.

In operation, air enters the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused by the diffuser section 74 axially forward in the engine 10 into the annular combustor 30. The compressed core airflow from the hollow fan blades 28 is mixed with fuel in the annular combustor 30 and ignited to form a high-energy gas stream. The high-energy gas stream is expanded over the multiple of tip turbine blades 34 mounted about the outer periphery of the fan-turbine rotor assembly 24 to drive the fan-turbine rotor assembly 24, which in turn drives the axial compressor 22 through the gearbox assembly 90. Concurrent therewith, the fan-turbine rotor assembly 24 discharges fan bypass air axially aft to merge with the core airflow from the turbine 32 in an exhaust case 106. A multiple of exit guide vanes 108 are located between the static outer support housing 44 and the rotationally fixed static outer support structure 14 to guide the combined airflow out of the engine 10 to provide forward thrust. An exhaust mixer 110 mixes the airflow from the turbine blades 34 with the bypass airflow through the fan blades 28.

Figure 3:
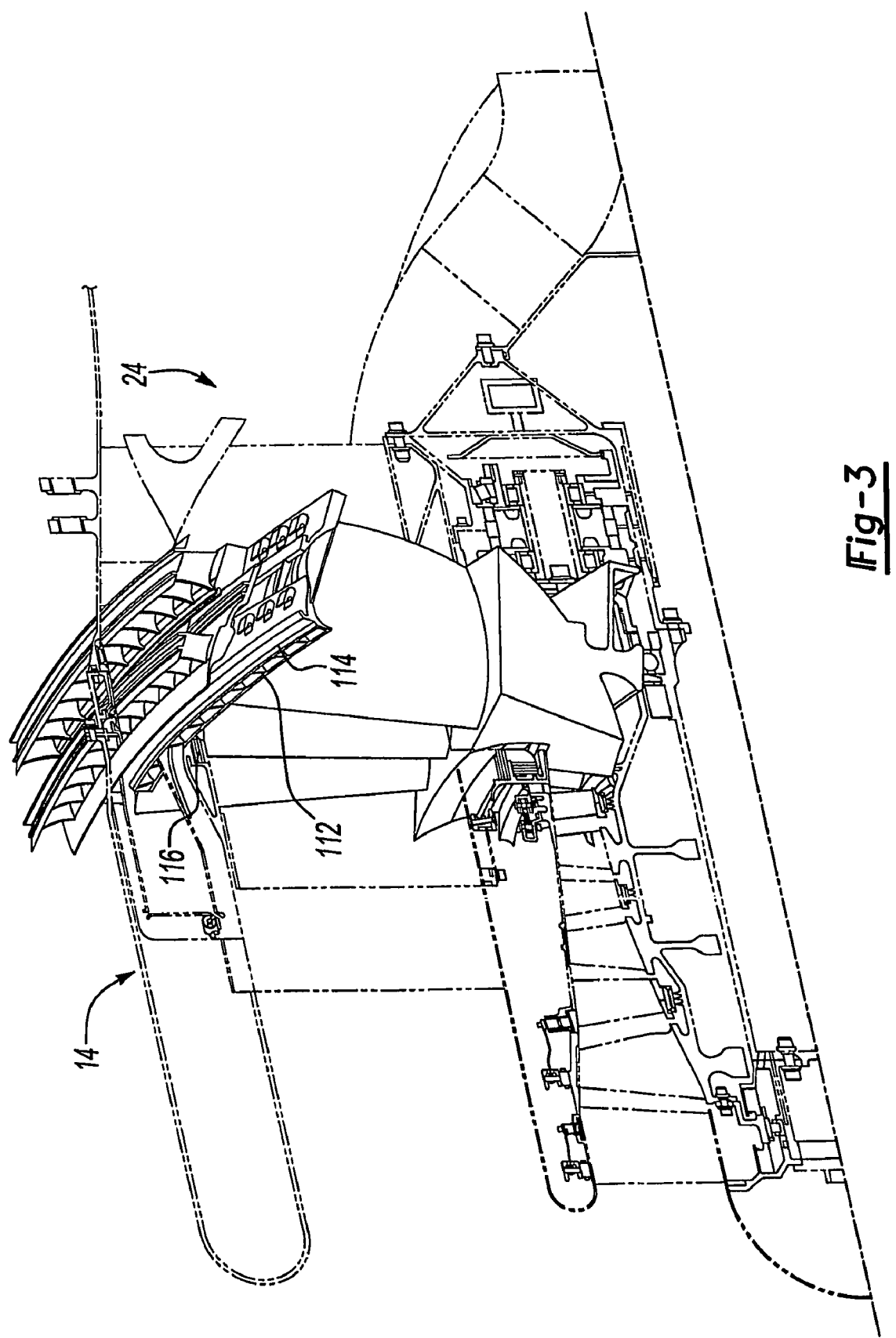
FIG. 3 is a partial perspective view of a fan-turbine rotor assembly.

The diffuser section 74 of the fan blade 28 includes an annular seal face surface 112 defined about the engine centerline A. The annular seal face surface 112 is preferably located below and directly adjacent a diffuser discharge 114 (also illustrated in FIG. 3) that communicates with the annular combustor 30.

Figure 4:
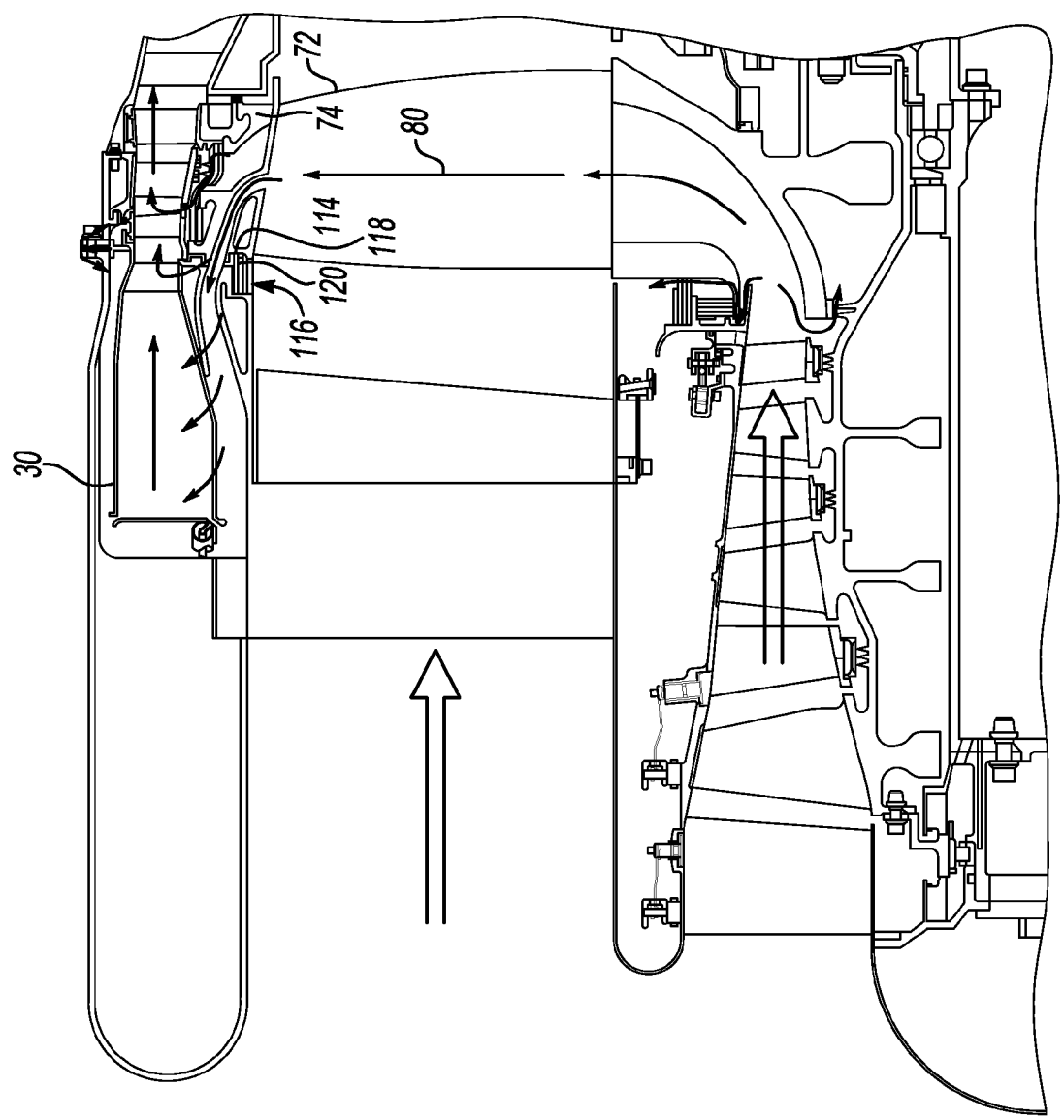
FIG. 4 is a schematic sectional view illustrating a seal assembly which seal a core airflow leakage path.

A seal assembly 116 is mounted within the rotationally fixed static outer support structure 14 for engagement with the annular seal face surface 112. The seal assembly 116 is preferably a face seal which includes radially surfaced rings 118, 120 running adjacent to one another, with one 118 rotating with the fan-turbine rotor assembly 24 and the other 120 ring fixed to the rotationally fixed static outer support structure 14 (FIG. 4). One example type of the seal assembly 116 is a STEIN seal manufactured by Stein Seal Company of Kulpsville, Pa. USA. It should be understood that other seal assembly will also be utilized by the present invention.

Referring to FIG. 4, the seal assembly 116 location minimizes leakage potential for core airflow when the airflow is turned and diffused by the diffuser section 74 toward an axial airflow direction toward the annular combustor 30. Minimization of core airflow leakage increases the engine operating efficiency.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A tip turbine engine comprising:
    a rotationally fixed support structure mounted along an engine centerline;
    a fan hub which rotates about said engine centerline;

an inducer section mounted to said fan hub, said inducer section having an axial inducer face and a radial inducer face which define an airflow passage which turns an airflow from an axial airflow direction to a radial airflow direction;

a fan blade section mounted to said inducer section, said fan blade section defining a fan blade core airflow passage generally perpendicular to the axis to receive the airflow from the inducer section;

a diffuser section attached to said fan blade, said diffuser section in communication with said core airflow passage to diffuse said airflow from said core airflow passage; and an annular seal assembly radially outboard of said fan blade section, said seal assembly includes a first and second radial ring which run adjacent to one another, said first radial ring rotatable with said diffuser and said second radial ring fixed to said rotationally fixed support structure.

2. The tip turbine engine as recited in claim 1, wherein said diffuser includes an annular seal face surface engageable with said seal assembly.

3. The tip turbine engine as recited in claim 1, further comprising an annular combustor adjacent said rotationally fixed support structure.

4. The tip turbine engine as recited in claim 3, further comprising a diffuser discharge in communication with said annular combustor, said seal assembly engaged with an annular seal face surface of said diffuser adjacent said diffuser discharge.

5. The tip turbine engine as recited in claim 2, wherein said annular seal face surface is located radially inboard and directly adjacent a diffuser discharge in communication with an annular combustor.

* * * * *